United States Patent
Muldoon et al.

(10) Patent No.: US 8,741,454 B2
(45) Date of Patent: *Jun. 3, 2014

(54) PROTON EXCHANGE MEMBRANE FOR FUEL CELL

(75) Inventors: John Muldoon, Saline, MI (US); Ryszard J. Wycisk, Cleveland, OH (US); Peter N. Pintauro, Shaker Heights, OH (US)

(73) Assignees: Toyota Motor Engineering & Manufacturing North America, Inc., Erlanger, KY (US); Case Western Reserve University, Cleveland, OH (US)

( * ) Notice: Subject to any disclaimer, the term of this patent is extended or adjusted under 35 U.S.C. 154(b) by 1558 days.

This patent is subject to a terminal disclaimer.

(21) Appl. No.: 11/770,249

(22) Filed: Jun. 28, 2007

(65) Prior Publication Data

US 2009/0004526 A1    Jan. 1, 2009

Related U.S. Application Data

(63) Continuation-in-part of application No. 11/391,592, filed on Mar. 28, 2006, now Pat. No. 8,227,135.

(60) Provisional application No. 60/666,276, filed on Mar. 29, 2005.

(51) Int. Cl.
*H01M 4/86* (2006.01)

(52) U.S. Cl.
USPC ............................. 429/42; 429/30; 521/27

(58) Field of Classification Search
USPC ........................................ 429/42, 30; 521/27
See application file for complete search history.

(56) References Cited

U.S. PATENT DOCUMENTS 3,357,931 A   12/1967  Rice et al.
4,211,677 A   7/1980   Rose et al.
(Continued)

FOREIGN PATENT DOCUMENTS

WO   WO-00/72395      11/2000
WO   WO-00/72395 A2 * 11/2000
(Continued)

OTHER PUBLICATIONS

Allcock, H.R. et al. Phenyl Phosphonic Acid Functionalized Poly[Aryloxyphosphazenes] as Proton-Conducting Membranes for Direct Methanol Fuel Cells; Journal of Membrane Science; (2002), pp. 47-54.*

(Continued)

*Primary Examiner* — Peter D. Mulcahy
*Assistant Examiner* — Henry Hu
(74) *Attorney, Agent, or Firm* — Gifford, Krass, Sprinkle, Anderson & Citkowski, P.C.

(57) ABSTRACT

A proton exchange membrane (PEM) with an ion exchange capacity of not less than 1 molar equivalent per kilogram and less than 20% water swelling is provided. The PEM includes a polymer having a polyphosphazene backbone with a polyaromatic functional group linked to the polyphosphazene as a polyaromatic side chain, a non-polyaromatic functional group linked to the polyphosphazene as a non-polyaromatic side chain, and an acidic functional group linked to the non-polyaromatic side chain. The polyaromatic functional group linked to the polyphosphazene provides for increased thermal and chemical stability, excellent ionic conductivities and low water swelling. The mole fraction of polyaromatic functional groups linked to the polyphosphazene backbone is between 0.05 and 0.60.

13 Claims, 2 Drawing Sheets

(56) References Cited

U.S. PATENT DOCUMENTS

| | | | |
|---|---|---|---|
| 5,548,060 | A | 8/1996 | Allcock et al. |
| 5,562,909 | A | 10/1996 | Allcock et al. |
| 6,214,251 | B1 | 4/2001 | Wu et al. |
| 6,312,853 | B1 * | 11/2001 | Zhang et al. ............. 429/213 |
| 6,365,294 | B1 * | 4/2002 | Pintauro et al. ............. 429/493 |
| 6,605,237 | B2 | 8/2003 | Allcock et al. |
| 6,759,157 | B1 | 7/2004 | Allcock et al. |
| 2004/0014936 | A1 | 1/2004 | Grunze et al. |
| 2004/0033406 | A1 | 2/2004 | Andrianov et al. |
| 2004/0039134 | A1 | 2/2004 | Murakami et al. |
| 2005/0014927 | A1 | 1/2005 | Akita |
| 2006/0182942 | A1 * | 8/2006 | Valle et al. ............. 428/304.4 |
| 2006/0194096 | A1 * | 8/2006 | Valle et al. ............. 429/42 |
| 2007/0015040 | A1 * | 1/2007 | Li et al. ............. 429/42 |
| 2008/0167392 | A1 * | 7/2008 | Muldoon et al. ............. 521/27 |
| 2009/0004526 | A1 | 1/2009 | Muldoon et al. |

FOREIGN PATENT DOCUMENTS

| | | |
|---|---|---|
| WO | WO-2006/076465 | 7/2006 |
| WO | WO-2006/105130 A2 | 10/2006 |
| WO | WO-2009/005881 A1 * | 1/2009 |

OTHER PUBLICATIONS

Mark V. Fedkin; Evaluation of Methanol Crossover in Proton-Conducting Polyphosphazene Membranes; Materials Letters; (2002), pp. 192-196.*

Harry R. Allcock et al.; Design and Synthesis of Ion-Conductive Polyphosphazenes for Fuel Cell Applications: Review; Journal of Polymer Science: Part B: Polymer Physics, vol. 44; (2006), pp. 2358-2368.*

Xiangyang Zhou et al.; High Temperature Transport Properties of Polyphosphazene Membranes for Direct Methanol Fuel Cells; Electrochimica Acta; (2003), pp. 2173-2180.*

Roziere, J. et al., Non-fluorinated polymer materials for proton exchange membrane fuel cells, Annual Review of Materials Research; 2003.

Pintauro, Peter N. et al; Sulfonated polyphosphazene membranes for direct methanol fuel cells; Applicative Aspects of poly(organophosphazenes); 2004; pp. 225-254.

Harry R. Allcock et al., Design and Synthesisi of Ion-Conductive Polphosphazenes for Fuel Cell Applications: Review; Wiley InterScience; 2005; pp. 2358-2368.

Ivan Huc et al., Aromatic Oligoamide Foldamers, Eur. J. Org. Chem; 2004; pp. 17-29.

Janice W. Hong et al., Solvatochromism of Distyrylbenzene Pairs Bound Together by (2.2)Paracyclophane: Evidence for a Polarizable "Through-Space" Delocalized State; JACS Communication, 2005; pp. 7435-7443.

Anne J. McNeil at al.; Conjugated Polymers in an Arene Sandwich; JACS Communications; Aug. 2006; pp. A-B.

Allcock, H.R. et al. Phenyl Phosphonic Acid Functionalized Poly[Aryloxyphosphazenes] as Proton-Conducting Membranes for Direct Methanol Fuel Cells; Journal of Membrane Science; (2002;) pp. 47-54.

Mark V. Fedkin; Evaluation of Methanol Crossover in Proton-Conducting Polyphosphazene Membranes; Materials Letters; (2002) 192-196.

Xiangyang Zhou et al.; High Temperature Transport Properties of Polyphosphazene Membranes for Direct Methanol Fuel Cells; Electrochimica Acta; (2003); pp. 2173-2180.

Harry R. Allcock et al.; Design and Synthesis of Ion-Conductive Polyphosphazenes for Fuel Cell Applications: Review; Journal of Polymer Science: Part B: Polymer Physics, vol. 44; (2006); pp. 2358-2368.

Allcock, H.R. et al.; Phosphonation of Aryloxyphosphazenes; Macromolecules; (2001).

Hoffman, M.A. et al.; Synthesis of Polyphosphazenes with Sulfonimide Side Groups; Macromolecules (2002).

Allcock, H.R. et al.; Phenylphosphonic Acid Functionalized Poly[aryloxyphosphazenes]; Macromolecules; (2002).

Fei, S.T. et al.; Inorganic-organic Hybrid Polymers with Pendent Sulfonated Cyclic Phosphazene Side Groups as Potential Proton Conductive; Journal of Membrane Science; (2008).

* cited by examiner

PROTON EXCHANGE MEMBRANE FOR FUEL CELL

CROSS-REFERENCE TO RELATED APPLICATIONS

This application is a continuation-in-part and claims priority to U.S. patent application Ser. No. 11/391,592 filed on Mar. 28, 2006, now U.S. Pat. No. 8,227,135 which in turn claims priority to U.S. Provisional Patent Application Ser. No. 60/666,276 filed on Mar. 29, 2005, both of which are included herein in their entirety by reference.

FIELD OF THE INVENTION

The present invention relates to a proton exchange membrane, in particular to a high performance polyphosphazene polymer proton exchange membrane.

BACKGROUND OF THE INVENTION

A proton exchange membrane (PEM) is a semi-permeable membrane typically made from ionomers designed to conduct protons while being essentially impermeable to gases such as oxygen or hydrogen. Thus, separation of reactants and the transport of protons is the basic function of a PEM when used in a proton exchange membrane fuel cell.

A PEM can be made from either a polymeric material or a polymeric composite membrane where other materials are embedded into the polymer matrix. Nafion® is one of the most common and commercially available PEM materials on the market today. Nafion® is a sulfonated tetrafluoroethylene copolymer which incorporates perfluorovinyl ether side chains terminated with sulfonic acid groups. However, Nafion® has limitations such as an upper operational temperature limit of about 80° C., a high permeability to methanol, the release of fluorine upon its decomposition and high cost. Due in part to these limitations alternative membrane materials have been, and are currently being, researched for suitable alternatives and replacements.

Alternative polymers to Nafion® that have been researched include polybenzimidazoles, poly(phenylene oxides) and poly(arylene ethers), all of which contain aryl rings in the polymer backbone. Polymers such as these do not inherently conduct protons and must be modified to incorporate acidic functionalities, usually sulfonic acid groups. The modification is typically accomplished by sulfonation of the polymers with $SO_3$, concentrated $H_2SO_4$ or $ClSO_3H$. Unfortunately, these sulfonated polyarylenes suffer from numerous problems including lower ionic conductivity or poor dimensional stability in water at high ion conductivity and form low oxidative stability Due to low oxidative stability, questions remain about the lifetime of membrane-electrode assemblies containing these sulfonated polyarylenes.

Polyphosphazenes have also been considered for PEM materials. Polyphosphazenes are polymers that possess a backbone of alternating phosphorus and nitrogen atoms, wherein each phosphorus atom is linked to two organic, inorganic, or organometallic side groups. Factors affecting the design of a successful PEM material may include thermal, mechanical, and chemical stability; barrier properties; and water uptake/hydrophobicity. Currently, polyphosphazenes that have yielded the best combination of properties have been aryloxy substituted materials. For example, Pintauro et al. in U.S. Pat. No. 6,365,294 disclosed sulfonated polyaryloxy substituted phosphazenes such as poly[bis(3-metlhylphenoxy)phosphazene], poly[(3-metlhylphenoxy)(phenoxy)phosphazene], poly[(3-ethylphenoxy)(phenoxy)phosphazene], poly[3-methylphenoxy)(3-ethylphenoxy)phosphazene], and the like. In addition, Hiroshi Akita has disclosed in U.S. Patent Application Publication No. 2005/0014927 a polyphosphazene derivative and an aromatic ring compound bonded to one another to obtain an intermediate product. In particular, Hiroshi Akita has disclosed a sulfonated polyphosphazene derivative wherein a sulfonic acid group is bonded to an aromatic ring and the average molecular weight of said derivative is not less than 25,000.

Current sulfonated phosphazene polymers are hindered by excess water swelling when said polymers approach the ion exchange capacity and resulting high ionic conductivity levels required by proton exchange membrane fuel cells. For example, solution-cast membranes made from sulfonated polymers with proton conductivities greater than 0.45 S/cm have exhibited very poor dimensional stability in water (Rozière et al. *Annu. Rev. Mater. Res.* 2003. 33, 503-55, FIG. 14).

SUMMARY OF THE INVENTION

A proton exchange membrane (PEM) with an ion exchange capacity of not less than 1 molar equivalent per kilogram and less than 20% water swelling is provided. The PEM includes a polymer having a polyphosphazene backbone with a polyaromatic functional group linked to the polyphosphazene as a polyaromatic side chain, a non-polyaromatic functional group linked to the polyphosphazene as a non-polyaromatic side chain, and an acidic functional group linked to the non-polyaromatic side chain. The polyaromatic functional group linked to the polyphosphazene provides for increased thermal and chemical stability, excellent ionic conductivities and low water swelling. The mole fraction of polyaromatic functional groups linked to the polyphosphazene backbone is between 0.05 and 0.60.

The polyaromatic functional group is an R and/or OR group which can be selected from an extended pi conjugated system, said system possibly including an organic oligomer with at least two repeat units containing a six-membered aromatic sextet structure. In the alternative, the R and/or OR group can be selected from a polycyclic aromatic group wherein R can include a fused six-membered aromatic sextet structure ring system having at least two rings, a six-membered aromatic sextet structure fused with a five-membered ring structure or at least two rings with one ring being a six-membered aromatic sextet structure and a second ring containing a nonmetal element such as nitrogen or oxygen.

The non-polyaromatic functional group is an OR, NRR' and/or R group wherein R and R' can be an alkyl, a fluoroalkyl, a phenyl, an oxyphenyl or an aromatic heterocycle. The acidic functional group includes a sulfonic acid, a phosphonic acid and/or a sulfonimide unit. In this manner a PEM is provided that exhibits an ion exchange capacity greater than 1.3 mole equivalent per kilogram and less than about 20% water swelling.

DETAILED DESCRIPTION OF THE INVENTION

Figure 1:
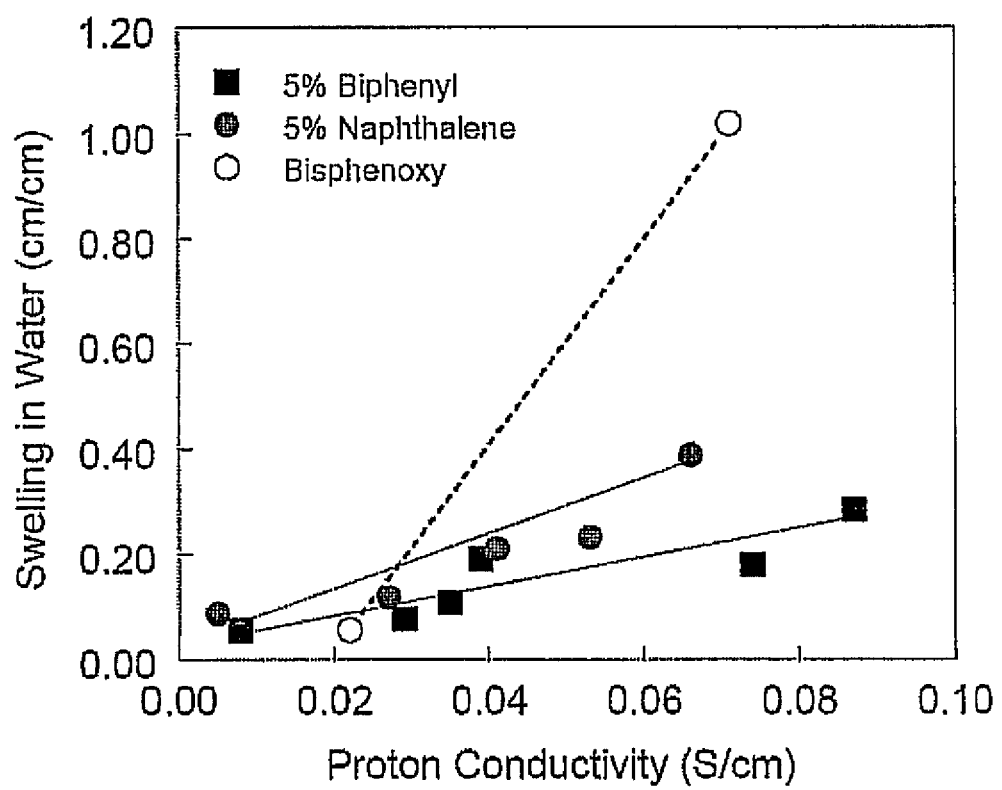
FIG. 1 shows the correlation of swelling in water as a function of proton conductivity for materials of the present invention.

The present invention comprises a new class of polyphosphazene polymers that provide excellent ionic conductivity with limited water swelling. As such, the present invention has utility as a proton exchange membrane (PEM) for proton exchange membrane fuel cells.

The PEM material of the present invention is a novel class of PEM materials comprised of sulfonated polyaromatic polyphosphazenes. As is known in the art, PEM materials must balance properties such as chemical stability, thermal stability, water swelling and conductivity. In the present invention, the PEM material comprises a polyphosphazene polymer with polyaromatic functional groups as side chains. In some instances, the polyaromatic functional group is an extended pi conjugated system.

A sulfonated polyaromatic polyphosphazene according to one embodiment of the present invention is a polymer having the following structural formula A

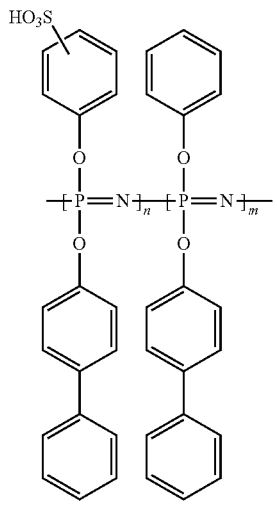

In the structural formula A, the polyphosphazene backbone has a sulfonated phenoxy side chain, a non-sulfonated phenoxy side chain, and a polyaromatic side chain. The polyaromatic side chain in the present embodiment is 4-phenylphenoxy. The sulfonated phenoxy side chain is comprised of the sulfonic acid group linked to the phenoxy side group. The sulfonic acid group may be positioned at any one of 2-positions, 4-positions, 5-positions and 6-positions. In the alternative, the polyaromatic phosphazene polymers of the present invention can be comprised of phosphonic acid functional groups linked to the non-polyaromatic side chains. In addition, sulfonimide functionalized polyphosphazenes are included in the present invention.

A different embodiment of the present invention is a polymer having the following structural formula B

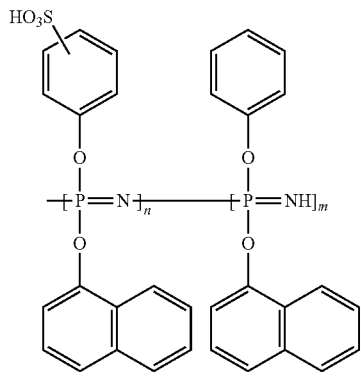

The structural formula B shows a similar phenoxy side group substituted with sulfonic acid as with the structural formula A above, however the polyaromatic side chain is comprised of naphthalene.

Yet another embodiment of the present invention is a polymer having the following structural formula C wherein the polyphosphazene backbone has a polyaromatic side chain with three repeat units of 4-phenylphenoxy. Thus it is appreciated that the present invention includes a sulfonated polyphosphazene backbone with a polyaromatic side chain having a plurality of repeat units and is not limited by the examples shown in the diagrams.

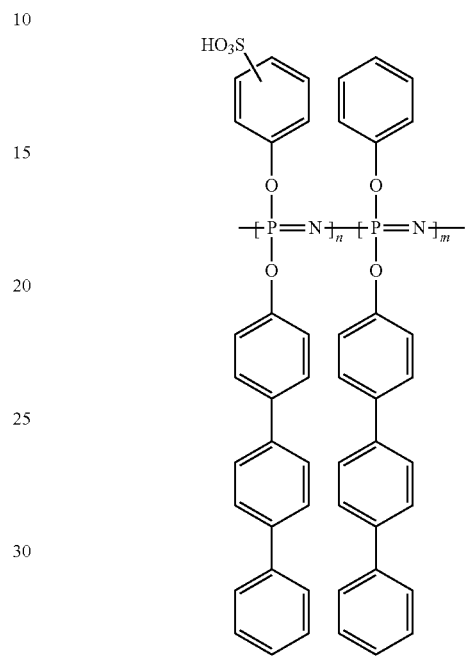

A sulfonated non-polyaromatic side chain can also include linked functional groups in addition to a sulfonic acid, phosphonic acid and sulfonimide side groups. For example, as shown in structural formula D, the sulfonated non-polyaromatic side group can have an electron-withdrawing group attached to increase the acid dissociation constant of the sulfonic acid.

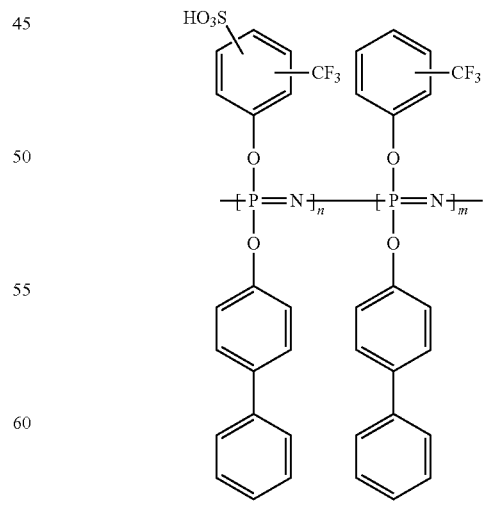

The polyaromatic functional groups of structural formulas A-D, and other embodiments that fall within the present invention, can be represented by functional groups R and OR, with R being an extended pi conjugated system, illustratively including biphenyl, naphthalene and their derivatives. In the alternative, R and OR can both be an extended pi conjugated system of an organic oligomer with at least two repeat units containing a six-membered aromatic sextet structure, illustratively including triphenyl and tetraphenyl.

The functional groups R and OR can also include a polycyclic aromatic group, with R including a fused six-membered aromatic sextet structure ring system having at least two rings or a six-membered aromatic sextet structure ring fused with a five-membered ring structure. The R functional group can also include at least two rings with a first ring being a six-membered aromatic sextet structure and a second ring containing a nonmetal such as nitrogen and/or oxygen.

In one instance, the sulfonated polyphosphazenes of the present invention include 5 to 60% (0.05 to 0.60 mole fraction) polyaromatic side chains with the remainder being non-polyaromatic side chains. More preferably 5 to 30% polyaromatic side chains are present in the sulfonated polyphosphazene, and even more preferred 5 to 20%.

The non-polyaromatic functional groups can be represented by functional groups OR, NRR' and/or R, wherein R and R' include alkyls, fluoroakyls, phenyls, phenyoxys, and/or aromatic heterocycles.

Although not limiting the invention in any way, an example of a method producing a PEM material of the present invention and associated properties is described below.

EXAMPLE

Starting materials of poly[(4-biphenyl phenoxy)(phenoxy) phosphazene] containing 5%, 10% and 30% biphenyl side chains were sulfonated. The polymers were dissolved in dicwloroethane (DCE) by stirring said polymers in the DCE for 12 hours at 25° C. Thereafter, the solution was purged with nitrogen and cooled to 0° C. with ice. Nawile stirring intensively, a specified amount of $SO_3$/DCE solution was added to the polyphosphazene. The sulfonated product precipitated out of solution and formed a milky suspension. After 2 hours of stirring, the solution was neutralized with a NaOH/methanol solution and the DCE and methanol solvents were evaporated at 60° C. The remaining product was washed several times with distilled water and 0.1 M NaOH, followed by distilled water.

A membrane was prepared by dissolving the dry sulfonated phosphazene polymer into dimethylacetamide (MAc) at 150° C. After cooling to room temperature, the solution was cast into a polytetrafluoroethylene (PTFE) dish. The solvent was evaporated at 80° C. and the dry film was treated in 1 molar sulfuric acid and washed repeatedly with distilled water. The ion-exchange capacity, equilibrium water swelling, proton conductivity and oxygen permeability at room temperature and 50% relative humidity were determined along with differential scanning calorimetry performed on selected samples. A sample containing 5% naphthalene side chains was also produced and tested.

Turning to FIG. 1, a graph showing the swelling in water as a function of proton conductivity for the various samples is shown. Water swelling was determined from the linear swelling of a circular membrane sample using the expression:

$$\text{Swelling(cm/cm)} = \frac{\text{final diameter} - \text{initial diameter}}{\text{initial diameter}}$$

The proton conductivity was measured by an AC impedance method. Membrane samples were soaked in distilled water for 24 hours before measuring conductivity. As shown in this figure, the 5% biphenyl and 5% naplithalene samples exhibit a significantly lower water swelling for a given proton conductivity when compared to current state-of-the-art sulfonated bisphenoxy polyphosphazene. In addition, samples of the sulfonated polyaromatic phosphazenes of the present invention demonstrated an ion exchange conductivity of greater than 1.0 mmol/g and swelling of less than 20% and an ion exchange conductivity of greater than 1.4 mmol/g and swelling less than 25%.

Figure 2:
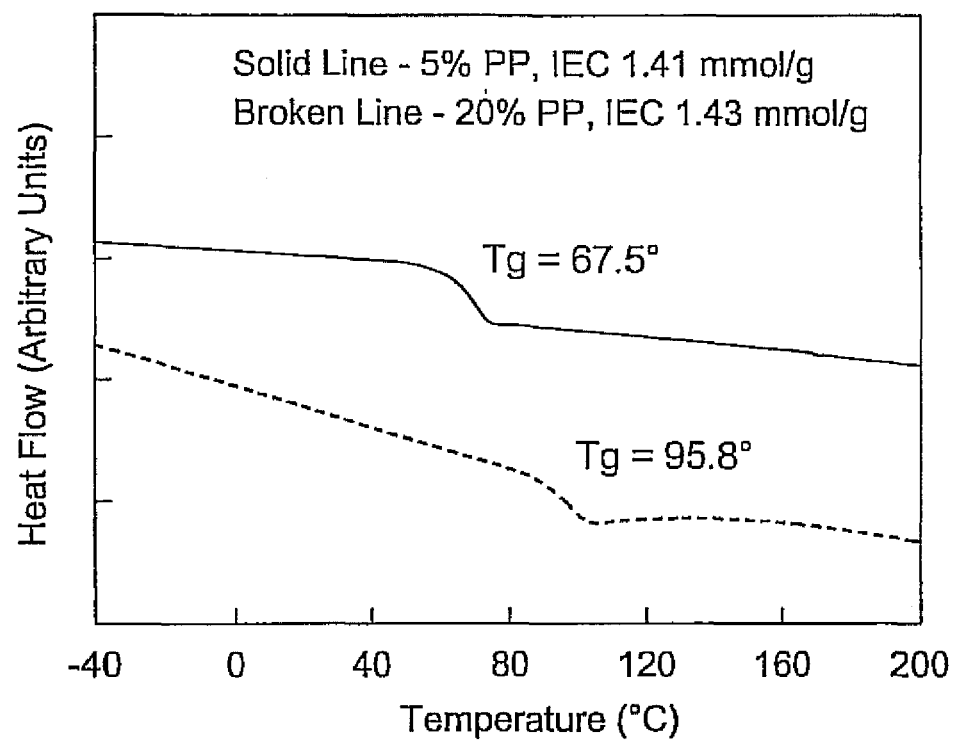
FIG. 2 shows the glass transition temperature for two PEM materials having different levels of phenylphenoxy groups.

FIG. 2 illustrates that the glass transition temperature (Tg) of the PEM materials of the present invention can be adjusted by varying the amount of polyaromatic side chains present on the polyphosphazene backbone. By increasing the phenylphenoxy group content from 5% to 20%, the glass transition temperature for the phosphazene polymer was raised from 67.5° C. to 95.8° C.

The polymer materials of the present invention also exhibit thermosetting behavior. For example, freshly synthesized unsulfonated phenylphenoxy phosphazene polymers used in the example were initially soluble in tetrahydrofuran (THF) at room temperature. However, after heating said polymers to 60° C., these same materials were not soluble in THF and only exhibited swelling. Not being bound by theory, the thermosetting behavior is believed to be due to the pi-pi stacking of the polyaromatic group. The thermosetting of the sulfonated polymer results in a dramatic decrease in the water swelling compared to sulfonated poly[bis(alkylphenoxy) phosphazene] and sulfonated poly[(alkylphenoxy)(phenoxyphosphazene] materials.

In addition, a significant decrease in the gas permeability of the sulfonated polyaromatic phosphazene materials was exhibited when compared to current state-of-the-art sulfonated polyaryloxy phosphazene materials. For example, the gas permeability of a 5% phenylphenoxy sulfonated polyphosphazene made in accord with the present invention exhibited a permeability rate 5 times lower than that exhibited by Nafion® when tested in oxygen at room temperature and 50% relative humidity.

In this manner, sulfonated polyphosphazenes including 5 to 60% polyaromatic side chains (0.05 to 0.60 mole fraction) with the remainder being non-polyaromatic side chains are provided in the present invention. The sulfonated polyphosphazenes with die 5 to 60% polyaromatic side chains provide improved ion-exchange capacity, equilibrium water swelling, proton conductivity and oxygen permeability characteristics when compared to current state-of-the-art PEM materials. In addition, the PEM materials of the present invention demonstrate excellent thermal and chemical stability.

The foregoing drawings, chemical structures, discussion and description are illustrative of specific embodiments of the present invention, but they are not meant to be limitations upon the practice thereof. Numerous modifications and variations of the invention will be readily apparent to those of skill in the art in view of the teaching presented herein. It is the following claims, including all equivalents, which define the scope of the invention.

The invention claimed is:
1. A proton exchange membrane material comprising:
   a polymer having a polyphosphazene backbone;
   a polyaromatic functional group linked to said polyphosphazene as a polyaromatic side chain;
   a functional group other than said polyaromatic functional group linked to said polyphosphazene as a non polyaromatic side chain; and an acidic functional group linked to said side chain, for the purpose of providing proton exchange properties.

2. The invention of claim 1, wherein said polyaromatic functional group is selected from the group consisting of R and OR, said R and said OR comprising an extended pi conjugated system.

3. The invention of claim 2, wherein said R and said OR are comprised of an extended pi conjugated system of an organic oligomer with at least two repeat units containing a six-membered aromatic sextet structure.

4. The invention of claim 1, wherein said polyaromatic functional group is selected from the group consisting of R and OR, said R and said OR comprising a polycyclic aromatic group.

5. The invention of claim 4, wherein R is a fused six-membered aromatic sextet structure ring system having at least two rings.

6. The invention of claim 4, wherein R is a six-membered aromatic sextet structure ring fused with a five-membered ring structure.

7. The invention of claim 4, wherein R has at least two rings, a first ring being a six-membered aromatic sextet structure and a second ring containing a nonmetal selected from the group consisting of nitrogen and oxygen.

8. The invention of claim 1, wherein said functional group other than said polyaromatic functional group is selected from the group consisting of OR, NRR', R and combinations thereof, said R and R' selected from the group consisting of an alkyl, a fluoroalkyl, a phenyl, an oxyphenyl and an aromatic heterocycle.

9. The invention of claim 1, wherein said acidic functional group is selected from the group consisting of sulfonic acid, phosphoric acid, a sulfonamide unit and combinations thereof.

10. The invention of claim 1, wherein a mole fraction of said polyaromatic functional group linked to said polyphosphazene as a polyaromatic side chain is between 0.05 and 0.60.

11. The invention of claim 1, wherein said polymer is a thermosetting polymer.

12. The invention of claim 1, wherein said polymer has an ion-exchange capacity of not less than 1.2 mmol/g.

13. The invention of claim 1, wherein said polymer has an ion-exchange capacity of not less than 2.0 mmol/g.

* * * * *